(12) United States Patent
Hosseini et al.

(10) Patent No.: US 11,665,732 B2
(45) Date of Patent: May 30, 2023

(54) UPLINK TRANSMISSION INTERRUPTION

(71) Applicant: QUALCOMM Incorporated, San Diego, CA (US)

(72) Inventors: Seyedkianoush Hosseini, San Diego, CA (US); Peter Gaal, San Diego, CA (US); Wanshi Chen, San Diego, CA (US); Wei Yang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 98 days.

(21) Appl. No.: 17/174,013

(22) Filed: Feb. 11, 2021

(65) Prior Publication Data

US 2021/0258974 A1    Aug. 19, 2021

Related U.S. Application Data

(60) Provisional application No. 62/977,011, filed on Feb. 14, 2020.

(51) Int. Cl.
*H04W 72/56* (2023.01)
*H04W 72/51* (2023.01)

(52) U.S. Cl.
CPC .......... *H04W 72/56* (2023.01); *H04W 72/51* (2023.01)

(58) Field of Classification Search
CPC ... H04W 72/10; H04W 72/048; H04W 72/56; H04W 72/51; H04W 72/569; H04W 76/34; H04W 72/23; H04L 5/0064; H04L 5/0042; H04L 27/26025
See application file for complete search history.

(56) References Cited

U.S. PATENT DOCUMENTS

2019/0230683 A1    7/2019  Akkarakaran et al.
2020/0229202 A1*   7/2020  Bagheri .............. H04W 72/042
2020/0296701 A1*   9/2020  Park ..................... H04L 1/1896
(Continued)

FOREIGN PATENT DOCUMENTS

WO    2019184688 A1    10/2019
WO    2020029299 A1    2/2020
(Continued)

OTHER PUBLICATIONS

Vivo, UL inter-UE Tx prioritization for URLLC, 3GPP TSG RAN WG1 Meeting #95 (R1-1812318), Spokane, USA, Nov. 12-16, 2018, pp. 1-10 (Year: 2018).*
(Continued)

*Primary Examiner* — Un C Cho
*Assistant Examiner* — Lalita W Pace
(74) *Attorney, Agent, or Firm* — Harrity & Harrity, LLP

(57) ABSTRACT

Various aspects of the present disclosure generally relate to wireless communication. In some aspects, a user equipment (UE) may identify a collision between a first uplink transmission and a second uplink transmission, wherein the first uplink transmission is a high priority uplink transmission and the second uplink transmission is a low priority uplink transmission; and cancel the second uplink transmission during a defined time period, wherein the defined time period has an end point based at least in part on a processing time and an offset, and a start point based at least in part on a triggering event for the first uplink transmission or a UE capability. Numerous other aspects are provided.

30 Claims, 7 Drawing Sheets

(56) References Cited

U.S. PATENT DOCUMENTS

| | | | |
|---|---|---|---|
| 2021/0144708 A1* | 5/2021 | Wang | H04W 72/1289 |
| 2021/0168783 A1* | 6/2021 | Islam | H04W 72/042 |
| 2022/0053459 A1* | 2/2022 | Shimezawa | H04L 1/189 |

FOREIGN PATENT DOCUMENTS

| | | | |
|---|---|---|---|
| WO | 2020033660 A1 | | 2/2020 |
| WO | WO-2021070064 A1 * | | 4/2021 |
| WO | WO-2021097590 A1 * | | 5/2021 |

OTHER PUBLICATIONS

International Search Report and Written Opinion—PCT/US2021/017927—ISA/EPO—dated Jun. 8, 2021.
Qualcomm Incorporated: "Uplink Inter-UE Tx Multiplexing and Prioritization", 3GPP Draft, 3GPP TSG-RAN WG1 #98b, R1-1911122, Uplink Inter-UE Tx Multiplexing and Prioritization, 3rd Generation Partnership Project (3GPP), Mobile Competence Centre, 650, Route Des Lucioles, F-06921, Sophia-Antipolis Cedex, vol. RAN WG1, No. Chongqing, China, Oct. 14, 2019-Oct. 20, 2019, Oct. 8, 2019 (Oct. 8, 2019), XP051809292, 9 pages, Retrieved from the Internet: URL:https://ftp.3gpp.org/tsg_ran/WG1_RL1/TSGR1_98b/Docs/R1-1911122.zip, R1-1911122, Uplink Inter-UE Tx Multiplexing and Prioritization.docx [retrieved on Oct. 8, 2019], Section "2.3 Applicability of UL Cancellation Indication to Uplink channels". paragraph 2.2, figure 3, The whole document.

\* cited by examiner

UPLINK TRANSMISSION INTERRUPTION

CROSS-REFERENCE TO RELATED APPLICATION

This patent application claims priority to U.S. Provisional Patent Application No. 62/977,011, filed on Feb. 14, 2020, entitled "UPLINK TRANSMISSION INTERRUPTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for uplink transmission interruption.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include identifying a collision between a first uplink transmission and a second uplink transmission, wherein the first uplink transmission is a high priority uplink transmission and the second uplink transmission is a low priority uplink transmission; and cancelling the second uplink transmission during a defined time period, wherein the defined time period has an end point based at least in part on a processing time and a configurable value, and a start point based at least in part on the end point and a UE capability.

In some aspects, a method of wireless communication, performed by a user equipment (UE), may include identifying a collision between a first uplink transmission and a second uplink transmission, wherein the first uplink transmission is a high priority uplink transmission and the second uplink transmission is a low priority uplink transmission; and cancelling the second uplink transmission during a defined time period, wherein the defined time period has an end point before a first overlapping symbol of the first uplink transmission and the second uplink transmission, wherein the first overlapping symbol is based at least in part on a processing time and an offset, and wherein the defined time period has a start point based at least in part on a triggering event for the first uplink transmission or a UE capability.

In some aspects, a method of wireless communication, performed by a UE, may include identifying a collision between a first uplink transmission and a second uplink transmission, wherein the first uplink transmission is a high priority uplink transmission and the second uplink transmission is a low priority uplink transmission; and cancelling the second uplink transmission during a transient duration, wherein the transient duration is a threshold amount of time occurring in proximity to a transmission cancellation end point.

In some aspects, a UE for wireless communication may include a memory and one or more processors operatively coupled to the memory. The memory and the one or more processors may be configured to identify a collision between a first uplink transmission and a second uplink transmission, wherein the first uplink transmission is a high priority uplink transmission and the second uplink transmission is a low priority uplink transmission; and cancel the second uplink transmission during a defined time period, wherein the defined time period has an end point based at least in part on a processing time and a configurable value, and a start point based at least in part on the end point and a UE capability.

In some aspects, a UE for wireless communication may include a memory and one or more processors operatively coupled to the memory. The memory and the one or more processors may be configured to identify a collision between a first uplink transmission and a second uplink transmission, wherein the first uplink transmission is a high priority uplink transmission and the second uplink transmission is a low priority uplink transmission; and cancel the second uplink transmission during a defined time period, wherein the defined time period has an end point before a first overlapping symbol of the first uplink transmission and the second uplink transmission, wherein the first overlapping symbol is based at least in part on a processing time and an offset, and wherein the defined time period has a start point based at least in part on a triggering event for the first uplink transmission or a UE capability.

In some aspects, a UE for wireless communication may include a memory and one or more processors operatively coupled to the memory. The memory and the one or more processors may be configured to identify a collision between a first uplink transmission and a second uplink transmission, wherein the first uplink transmission is a high priority uplink transmission and the second uplink transmission is a low priority uplink transmission; and cancel the second uplink transmission during a transient duration, wherein the transient duration is a threshold amount of time occurring in proximity to a transmission cancellation end point.

In some aspects, a non-transitory computer-readable medium may store one or more instructions for wireless communication. The one or more instructions, when executed by one or more processors of a UE, may cause the one or more processors to identify a collision between a first uplink transmission and a second uplink transmission, wherein the first uplink transmission is a high priority uplink transmission and the second uplink transmission is a low priority uplink transmission; and cancel the second uplink transmission during a defined time period, wherein the defined time period has an end point based at least in part on a processing time and a configurable value, and a start point based at least in part on the end point and a UE capability.

In some aspects, a non-transitory computer-readable medium may store one or more instructions for wireless communication. The one or more instructions, when executed by one or more processors of a UE, may cause the one or more processors to identify a collision between a first uplink transmission and a second uplink transmission, wherein the first uplink transmission is a high priority uplink transmission and the second uplink transmission is a low priority uplink transmission; and cancel the second uplink transmission during a defined time period, wherein the defined time period has an end point before a first overlapping symbol of the first uplink transmission and the second uplink transmission, wherein the first overlapping symbol is based at least in part on a processing time and an offset, and wherein the defined time period has a start point based at least in part on a triggering event for the first uplink transmission or a UE capability.

In some aspects, a non-transitory computer-readable medium may store one or more instructions for wireless communication. The one or more instructions, when executed by one or more processors of a UE, may cause the one or more processors to identify a collision between a first uplink transmission and a second uplink transmission, wherein the first uplink transmission is a high priority uplink transmission and the second uplink transmission is a low priority uplink transmission; and cancel the second uplink transmission during a transient duration, wherein the transient duration is a threshold amount of time occurring in proximity to a transmission cancellation end point.

In some aspects, an apparatus for wireless communication may include means for identifying a collision between a first uplink transmission and a second uplink transmission, wherein the first uplink transmission is a high priority uplink transmission and the second uplink transmission is a low priority uplink transmission; and means for cancelling the second uplink transmission during a defined time period, wherein the defined time period has an end point based at least in part on a processing time and a configurable value, and a start point based at least in part on the end point and a UE capability.

In some aspects, an apparatus for wireless communication may include means for identifying a collision between a first uplink transmission and a second uplink transmission, wherein the first uplink transmission is a high priority uplink transmission and the second uplink transmission is a low priority uplink transmission; and means for cancelling the second uplink transmission during a defined time period, wherein the defined time period has an end point before a first overlapping symbol of the first uplink transmission and the second uplink transmission, wherein the first overlapping symbol is based at least in part on a processing time and an offset, and wherein the defined time period has a start point based at least in part on a triggering event for the first uplink transmission or a UE capability.

In some aspects, an apparatus for wireless communication may include means for identifying a collision between a first uplink transmission and a second uplink transmission, wherein the first uplink transmission is a high priority uplink transmission and the second uplink transmission is a low priority uplink transmission; and means for cancelling the second uplink transmission during a transient duration, wherein the transient duration is a threshold amount of time occurring in proximity to a transmission cancellation end point.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
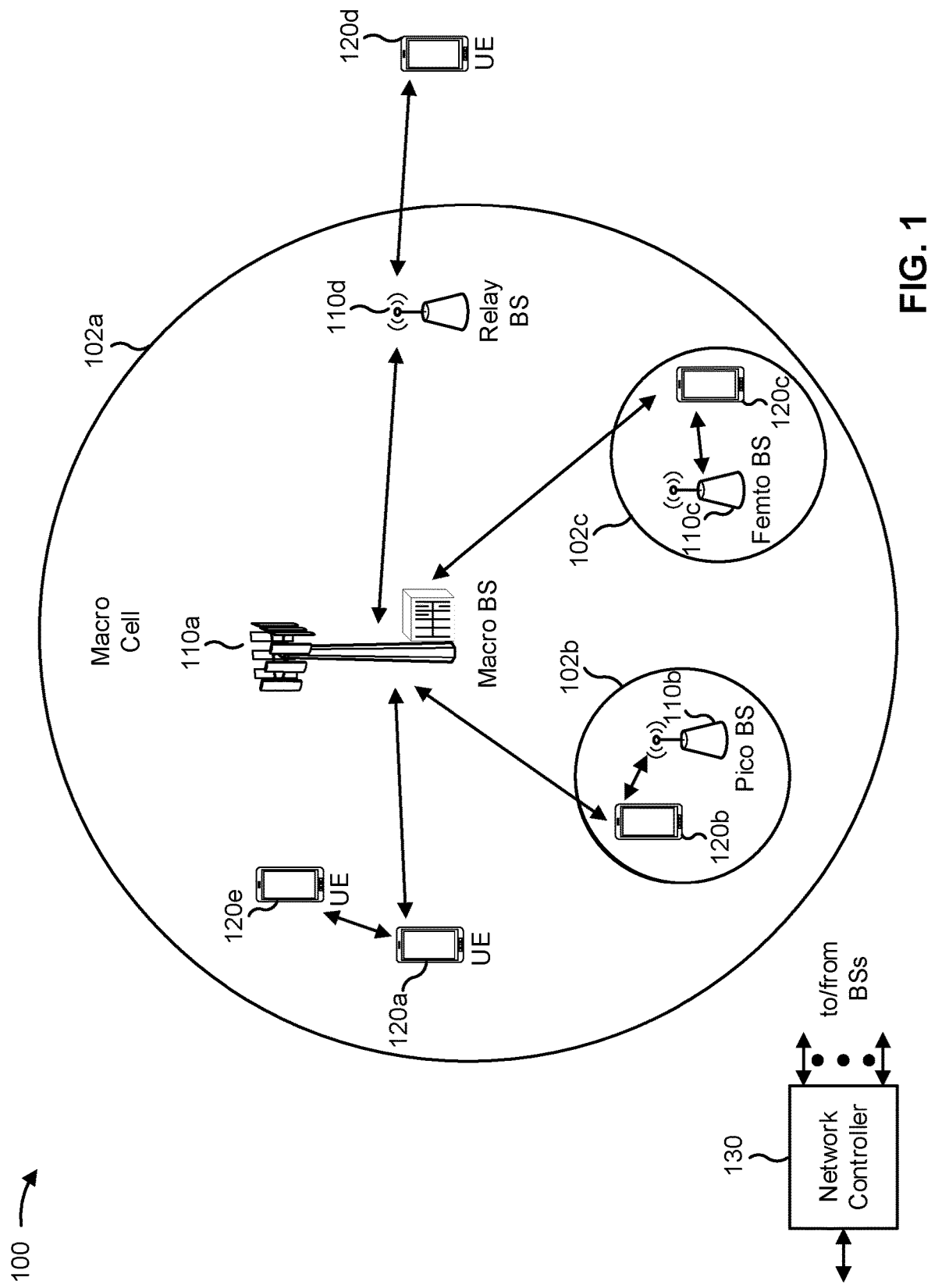
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
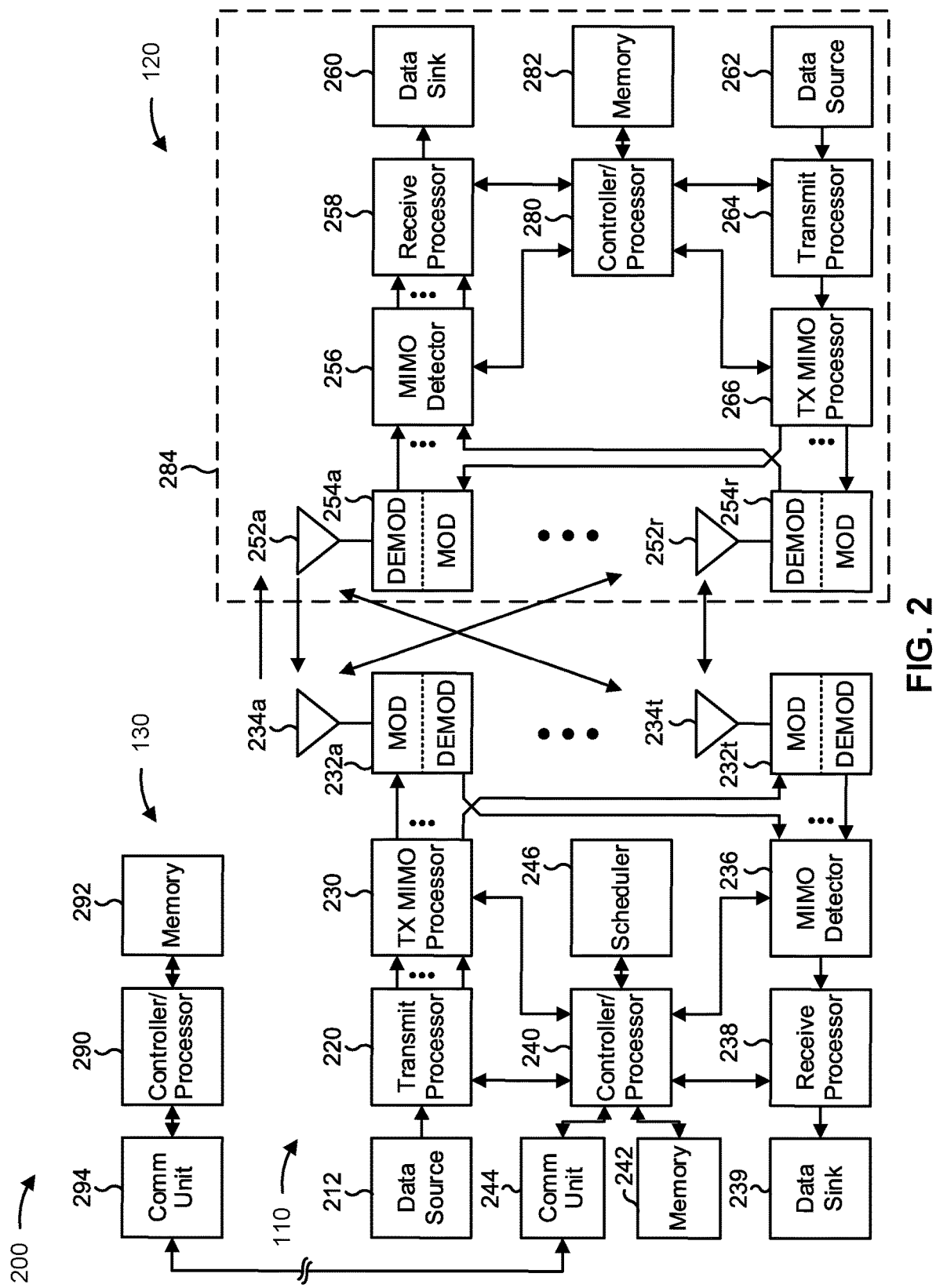
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-6.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-6.

Controller/processor 240 of base station 110, controller/processor 280 of UE 120, and/or any other component(s) of FIG. 2 may perform one or more techniques associated with uplink transmission interruption, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for identifying a collision between a first uplink transmission and a second uplink transmission, wherein the first uplink transmission is a high priority uplink transmission and the second uplink transmission is a low priority uplink transmission; means for cancelling the second uplink transmission during a defined time period, wherein the defined time period has an end point before a first overlapping symbol of the first uplink transmission and the second uplink transmission, wherein the first overlapping symbol is based at least in part on a processing time and an offset, and wherein the defined time period has a start point based at least in part on a triggering event for the first uplink transmission or a UE capability; or means for cancelling the second uplink transmission during a defined time period, wherein the defined time period has an end point before a first overlapping symbol of the first uplink transmission and the second uplink transmission, wherein the first overlapping symbol is based at least in part on a processing time and an offset, and wherein the defined time period has a start point based at least in part on a triggering event for the first uplink transmission or a UE capability. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the user equipment (UE) includes means for identifying collision based at least in part on receipt of an uplink cancellation indicator.

In some aspects, the user equipment (UE) includes means for identifying a collision between a first uplink transmission and a second uplink transmission, wherein the first uplink transmission is a high priority uplink transmission and the second uplink transmission is a low priority uplink transmission; or means for cancelling the second uplink transmission during a transient duration, wherein the transient duration is a threshold amount of time occurring in proximity to a transmission cancellation end point. The means for the user equipment (UE) to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some communications systems, different uplink channels may be associated with different priority levels. For example, a UE may receive a priority indication identifying a high priority uplink channel, such as a high priority physical uplink control channel (PUCCH), and a low priority uplink channel, such as a low priority physical uplink shared channel (PUSCH). A BS may use downlink control information (DCI) to convey a priority indication for a dynamic grant PUSCH, a PUCCH associated with a hybrid automatic repeat request (HARD) acknowledgement message (ACK) (HARQ-ACK), and/or the like. Similarly, the BS may use radio resource control (RRC) configuration information to convey a priority indication. Some uplink channels may be associated with a default priority and the UE may use the default priority unless an explicit indicator is received to override the default priority. For example, a periodic or semi-persistent channel state information (CSI) may be associated with a low priority as a default condition. Similarly, a periodic or semi-persistent sounding reference signal (SRS) may be associated with a low priority as a default condition.

When a plurality of uplink channels of different priorities collide in a time domain, the UE may be unable to multiplex the plurality of uplink channels together for transmission. Similarly, the UE may be unable to concurrently transmit the plurality of uplink channels. As a result, the UE may drop a low priority channel to enable a transmission of a high priority channel. For example, the UE may drop a low priority PUSCH to enable transmission of a high priority PUCCH on the same or a different carrier. Similarly, the UE may drop a low priority PUCCH to enable transmission of a high priority PUCCH on the same carrier.

When the UE identifies a collision between a high priority channel and a low priority channel (e.g., based on a received dynamic grant for the high priority channel), the UE may drop the low priority channel and associated low priority uplink transmission at a time defined by a specification. For example, the UE may cancel the low priority channel at a time represented by an equation:

$$T_{drop} = T_{proc,2} + d_1 \quad (1)$$

where $T_{drop}$ represents a time at which the low priority channel is to be dropped after an end of, for example, a physical downlink control channel (PDCCH) scheduling the high priority channel that collides with the low priority channel, $T_{proc,2}$ represents a UE processing time capability for a carrier on which the low priority channel is to be conveyed, and $d_1$ is an offset (sometimes referred to herein as a configurable value) (e.g., 0 symbols, 1 symbol, 2 symbols, and/or the like) that the UE may report in a UE capability message. In this way, the UE and the BS remain synchronized with regard to when the low priority channel is to be dropped. However, as a result, the UE may continue use of the low priority channel for a period of time up to $Tdro_p$. This may result in increased UE complexity, utilization of network resources, and/or the like.

Some aspects described herein enable early uplink transmission interruption. For example, the UE may identify a defined time period starting before $Tdro_p$ and ending at $Tam_p$ in which the UE may cancel the low priority transmission and associated low priority channel. In this case, the BS remains synchronized with the UE based at least in part on the cancellation of the low priority transmission occurring no later than $Tdro_p$. Moreover, based at least in part on enabling an earlier cancellation, reduced UE complexity as well as reduced utilization of network resources is enabled. Moreover, the defined time period may be used for scenarios without a dynamic grant, thereby providing additional flexibility for channel prioritization in a network. Furthermore, the UE may define a transient time at approximately a border between successive short sub-slots (e.g., sub-slots with 1 or 2 symbols), and may cancel a low priority transmission during the transient time. In this way, UE complexity may also be reduced.

Figure 3:
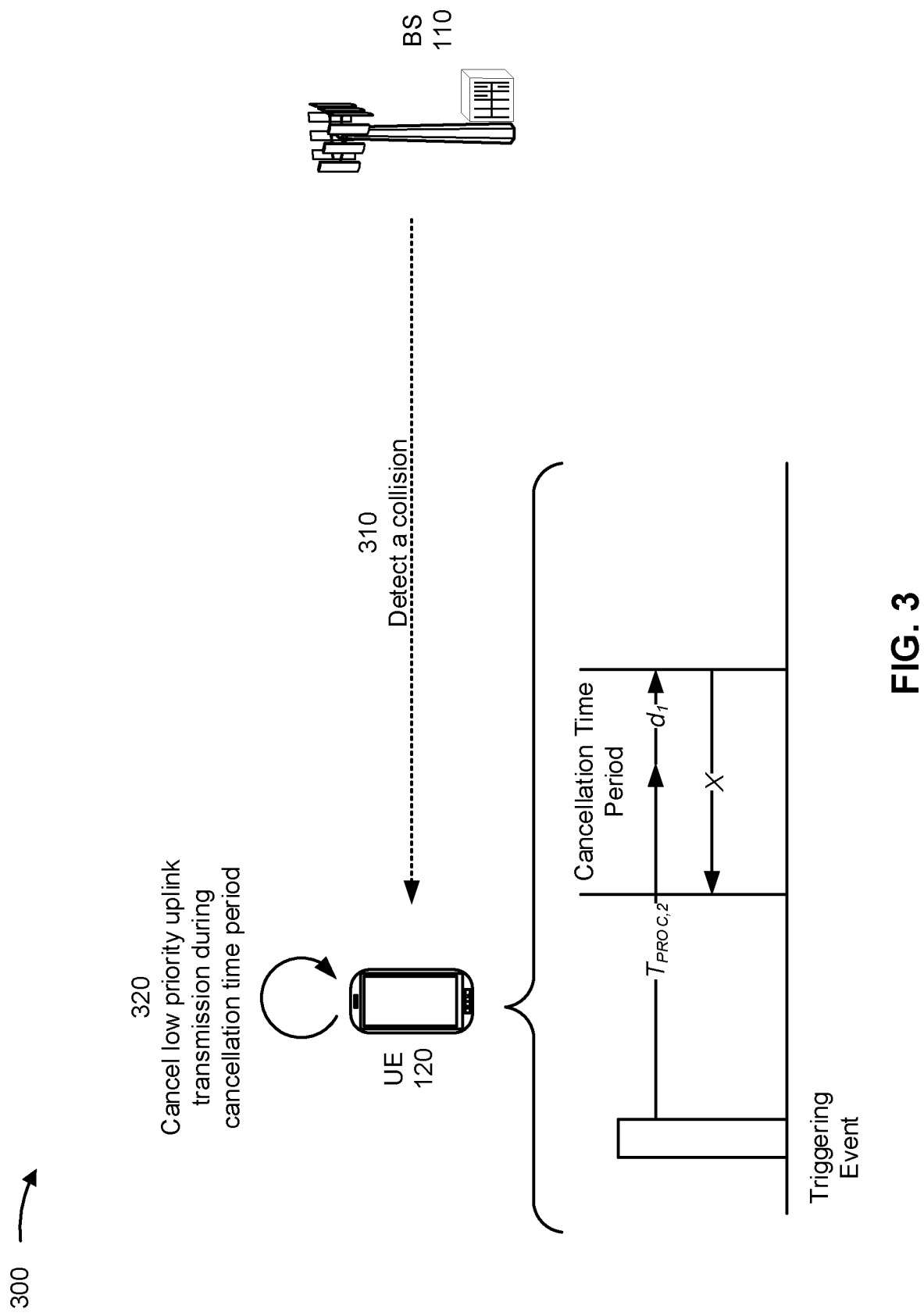
FIG. 3 is a diagram illustrating an example associated with uplink transmission interruption, in accordance with various aspects of the present disclosure.

FIG. 3 is a diagram illustrating an example 300 of uplink transmission interruption, in accordance with various aspects of the present disclosure. As shown in FIG. 3, example 300 may include a BS 110 and a UE 120.

As further shown in FIG. 3, and by reference number 310, UE 120 may detect a collision between a high priority uplink transmission and a low priority uplink transmission. For example, UE 120 may, in some aspects, receive a grant from BS 110 (e.g., a physical downlink control channel (PDCCH) communication) for a high priority PUCCH, and may determine that the high priority PUCCH collides with a low priority PUSCH that is to occur on the same carrier. Additionally, or alternatively, UE 120 may receive an uplink cancellation indicator (ULCI) from BS 110 that may cause UE 120 to determine to cancel an uplink transmission (e.g., the low priority uplink transmission, such as a PUSCH).

As further shown in FIG. 3, and by reference number 320, UE 120 may cancel a low priority uplink transmission. For example, based at least in part on detecting a collision between the low priority uplink transmission and the high priority uplink transmission, UE 120 may cancel the low priority uplink transmission. Additionally, or alternatively, based at least in part on receiving a ULCI from B S 110, UE 120 may cancel the low priority uplink transmission.

In some aspects, UE 120 may cancel the low priority uplink transmission during a defined time period. For example, UE 120 may identify a start point and an end point for the defined time period and may cancel the low priority uplink transmission between the start point and the end point, thereby maintaining synchronization with B S 110. In some aspects, UE 120 may determine the end point based at least in part on at least one of a processing time or an offset. For example, as described above, the end point may be at $T_{drop} = T_{proc,2} + d_1$. Additionally, or alternatively, UE 120 may determine the end point based at least in part on a fixed value (e.g., defined in a specification and stored in a data structure). In this case, the end point may occur before a first overlapping symbol of the high priority uplink transmission and the low priority uplink transmission. Additionally, or alternatively, the end point may occur a threshold amount of time after a triggering event (e.g., detection of the collision, receipt of a grant for the high priority uplink transmission, receipt of the ULCI, an end of a control resource set (CORESET) that conveys a grant, and/or the like).

In some aspects, UE 120 may determine the start point based at least in part on the end point. For example, UE 120 may determine the start point as occurring a threshold amount of time before the end point. In this case, UE 120 may determine the threshold amount of time based at least in part on a fixed value (e.g., defined in a specification and stored in a data structure). Additionally, or alternatively, UE 120 may determine the threshold amount of time based at least in part on a UE capability. For example, the start point may be defined based at least in part on an equation:

$$T_{Start}=T_{proc,2}+d_1-X \qquad (2)$$

where $T_{Start}$ is the start point and X is a value based at least in part on a UE capability, a specification defined value, and/or the like.

In some aspects, UE 120 may cancel the low priority uplink transmission, at the latest, before a first overlapping symbol of the high priority uplink transmission (e.g., a first symbol of the collision), and may cancel the low priority uplink transmission at any time after an end of the CORESET or PDCCH that conveys a grant for the high priority uplink transmission. In this case, $T_{drop}$ may represent an earliest time that the collision can occur. Thus, the defined time period may be considered to have a start point at an end of the CORESET or PDCCH that conveys a grant for the high priority uplink transmission, and an end point at the first overlapping symbol of the high priority uplink transmission.

In some aspects, UE 120 may determine a subcarrier spacing for the defined time period and/or the UE capability (e.g., used to calculate X). For example, UE 120 may determine the subcarrier spacing for the defined time period as the same subcarrier spacing used for $T_{proc,2}$. Additionally, or alternatively, UE 120 may determine the subcarrier spacing based at least in part on a subcarrier spacing (e.g., a minimum subcarrier spacing) of all downlink and/or uplink carriers configured for UE 120. Additionally, or alternatively, UE 120 may determine the subcarrier spacing based at least in part on a subcarrier spacing of all downlink and/or uplink carriers on which the low priority uplink transmission is to be conveyed, on which the grant of the high priority uplink transmission is received, on which the high priority channel is to be conveyed, and/or the like. Additionally, or alternatively, UE 120 may determine the subcarrier spacing based at least in part on a subcarrier spacing of a carrier on which the low priority uplink transmission is to be conveyed.

As indicated above, FIG. 3 is provided as an example. Other examples may differ from what is described with respect to FIG. 3.

Figure 4:
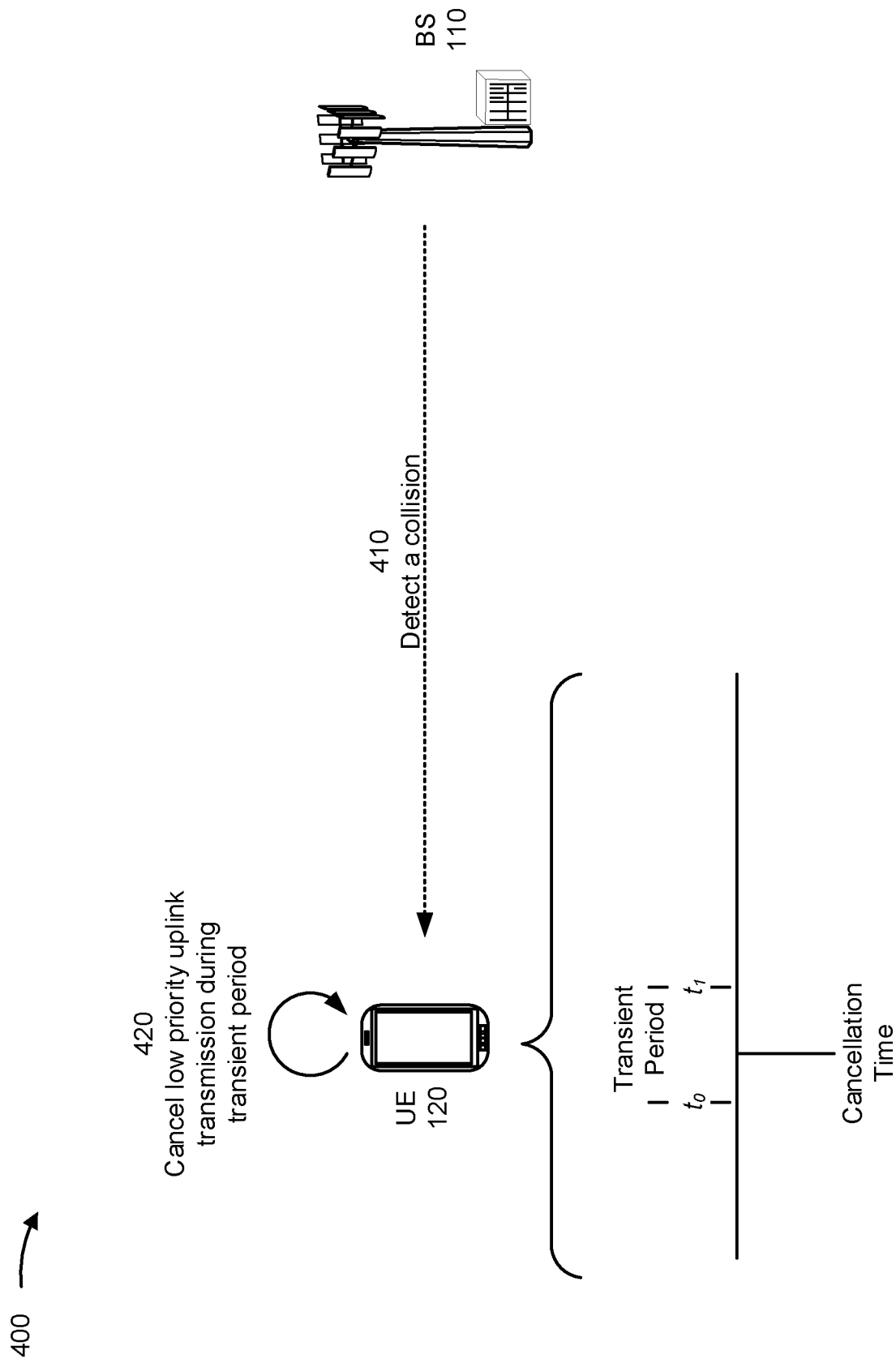
FIG. 4 is a diagram illustrating an example associated with uplink transmission interruption, in accordance with various aspects of the present disclosure.

FIG. 4 is a diagram illustrating an example 400 of uplink transmission interruption, in accordance with various aspects of the present disclosure. As shown in FIG. 4, example 400 may include a BS 110 and a UE 120.

As further shown in FIG. 4, and by reference number 410, UE 120 may detect a collision. For example, as described above, UE 120 may detect a collision between a high priority uplink transmission and a low priority uplink transmission based at least in part on receiving a grant for the high priority uplink transmission. Additionally, or alternatively, UE 120 may receive a ULCI indicating that the high priority uplink transmission is to be cancelled.

As further shown in FIG. 4, and by reference number 420, UE 120 may cancel the low priority uplink transmission. For example, UE 120 may cancel the low priority uplink transmission during a transient period. In some aspects, the transient period may be a particular period of time at approximately $T_{proc,2}$ after a triggering event (e.g., UE 120 receiving a grant, UE 120 receiving a ULCI, and/or the like). For example, the transient period may be during a power off-to-power on period associated with canceling the low priority uplink transmission. For example, the transient period may be at the cancellation time, such that the cancellation time is within the transient period. Additionally, or alternatively, the transient period may be immediately before the cancellation time, such that an end point of the transient period is approximately at the cancellation time.

As indicated above, FIG. 4 is provided as an example. Other examples may differ from what is described with respect to FIG. 4.

Figure 5:
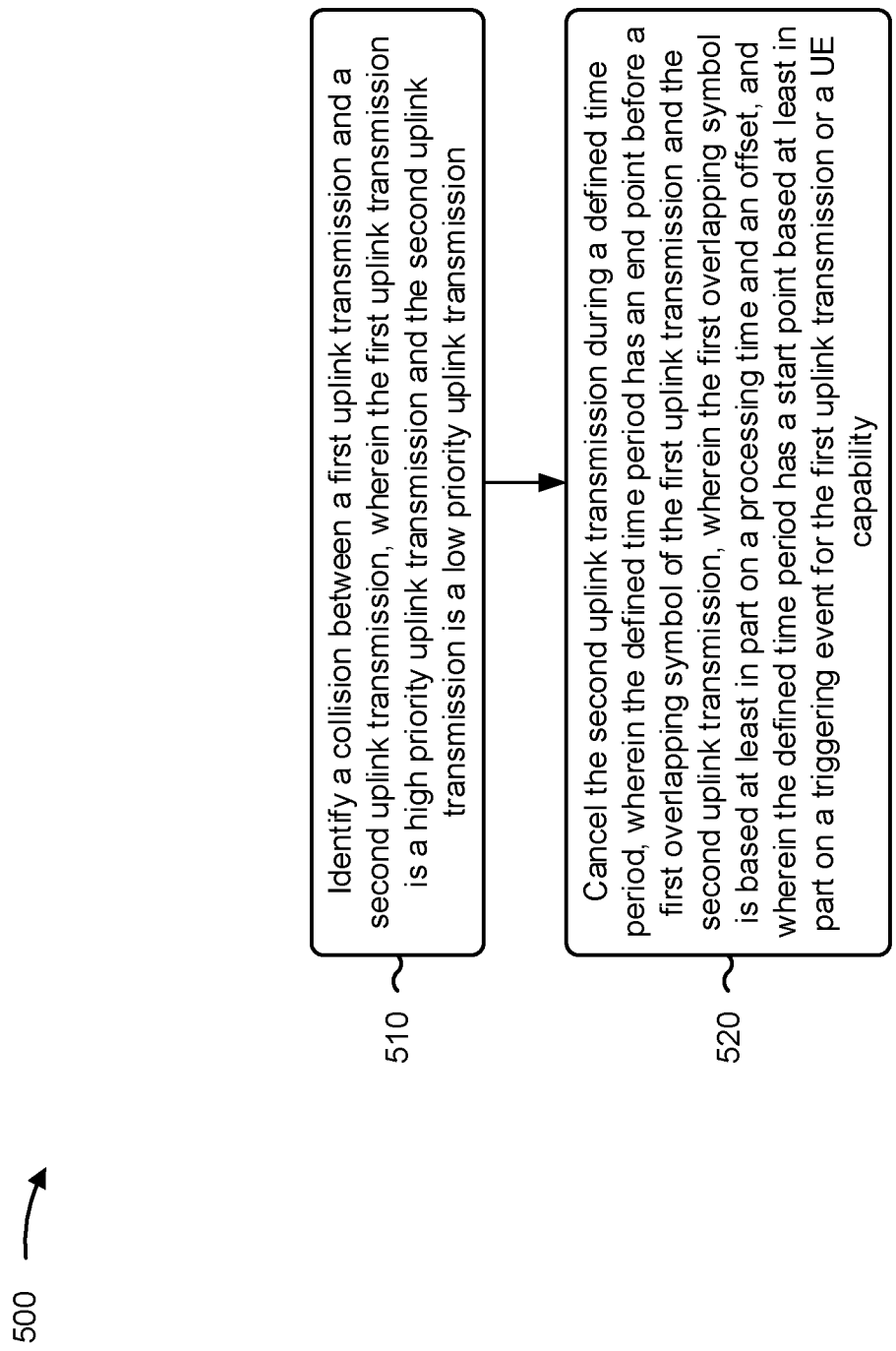
FIGS. 5-6 are diagrams illustrating example processes associated with uplink transmission interruption, in accordance with various aspects of the present disclosure.

FIG. 5 is a diagram illustrating an example process 500 performed, for example, by a UE, in accordance with various aspects of the present disclosure. Example process 500 is an example where the UE (e.g., UE 120 and/or the like) performs operations associated with uplink transmission interruption.

As shown in FIG. 5, in some aspects, process 500 may include identifying a collision between a first uplink transmission and a second uplink transmission, wherein the first uplink transmission is a high priority uplink transmission and the second uplink transmission is a low priority uplink transmission (block 510). For example, the UE (e.g., using receive processor 258, transmit processor 264, controller/processor 280, memory 282, and/or the like) may identify a collision between a first uplink transmission and a second uplink transmission, as described above. In some aspects, the first uplink transmission is a high priority uplink transmission and the second uplink transmission is a low priority uplink transmission.

As further shown in FIG. 5, in some aspects, process 500 may include cancelling the second uplink transmission during a defined time period, wherein the defined time period has an end point before a first overlapping symbol of the first uplink transmission and the second uplink transmission, wherein the first overlapping symbol is based at least in part on a processing time and an offset, and wherein the defined time period has a start point based at least in part on a triggering event for the first uplink transmission or a UE capability (block 520). For example, the UE (e.g., using receive processor 258, transmit processor 264, controller/processor 280, memory 282, and/or the like) may cancel the second uplink transmission during a defined time period, as described above. In some aspects, the defined time period has an end point based at least in part on a processing time and an offset, and a start point based at least in part on the end point or a UE capability. In some aspects, the defined time period has an end point before a first overlapping symbol of the first uplink transmission and the second uplink transmission, wherein the first overlapping symbol is based at least in part on a processing time and an offset, and wherein the defined time period has a start point based at least in part on a triggering event for the first uplink transmission or a UE capability. In some aspects, the offset is referred to herein as a configurable value. The offset may be determined by the UE and reported to the network. The firsts overlapping symbol may be based at least in part on a processing time and an offset. For example, the first overlapping symbol may occur at or after the processing time and the offset relative to the triggering event (e.g., after $T_{proc,2}+d_1$ following the triggering event).

Process 500 may include additional aspects, such as any single aspect or any combination of aspects described below and/or in connection with one or more other processes described elsewhere herein.

In a first aspect, identifying the collision includes identifying the collision based at least in part on receipt of an uplink cancellation indicator.

In a second aspect, alone or in combination with the first aspect, the defined time period is before a first overlapping symbol of the first uplink transmission and the second uplink transmission.

In a third aspect, alone or in combination with one or more of the first and second aspects, the end point is a threshold amount of time after a triggering event for the first uplink transmission, the threshold amount of time is based at least in part on the processing time and the offset.

In a fourth aspect, alone or in combination with one or more of the first through third aspects, the triggering event is an end of a control resource set in which the UE receives a grant for the first uplink transmission, and the start point is at or after the end of the control resource set.

In a fifth aspect, alone or in combination with one or more of the first through fourth aspects, the start point is a threshold amount of time before the end point, the threshold amount of time is a fixed value or based at least in part on the UE capability.

In a sixth aspect, alone or in combination with one or more of the first through fifth aspects, at least one of the start point or the end point is determined based at least in part on a first overlapping symbol of the first uplink transmission and the second uplink transmission.

In a seventh aspect, alone or in combination with one or more of the first through sixth aspects, a first quantity of symbols defining the defined time period based at least in part on the UE capability and a second quantity of symbols defining the defined time period based at least in part on the processing time have a common subcarrier spacing.

In an eighth aspect, alone or in combination with one or more of the first through seventh aspects, a quantity of symbols defining the defined time period has a subcarrier spacing based at least in part on at least one of a minimum subcarrier spacing of a set of downlink or uplink carriers configured for the UE, a minimum subcarrier spacing of a set of uplink carriers on which the second uplink transmission is to be carried and a set of downlink carriers on which a grant for the first uplink transmission is received, a subcarrier spacing of an uplink carrier on which the first uplink transmission is to be carried, or a subcarrier spacing of an uplink carrier on which the second uplink transmission is to be carried.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
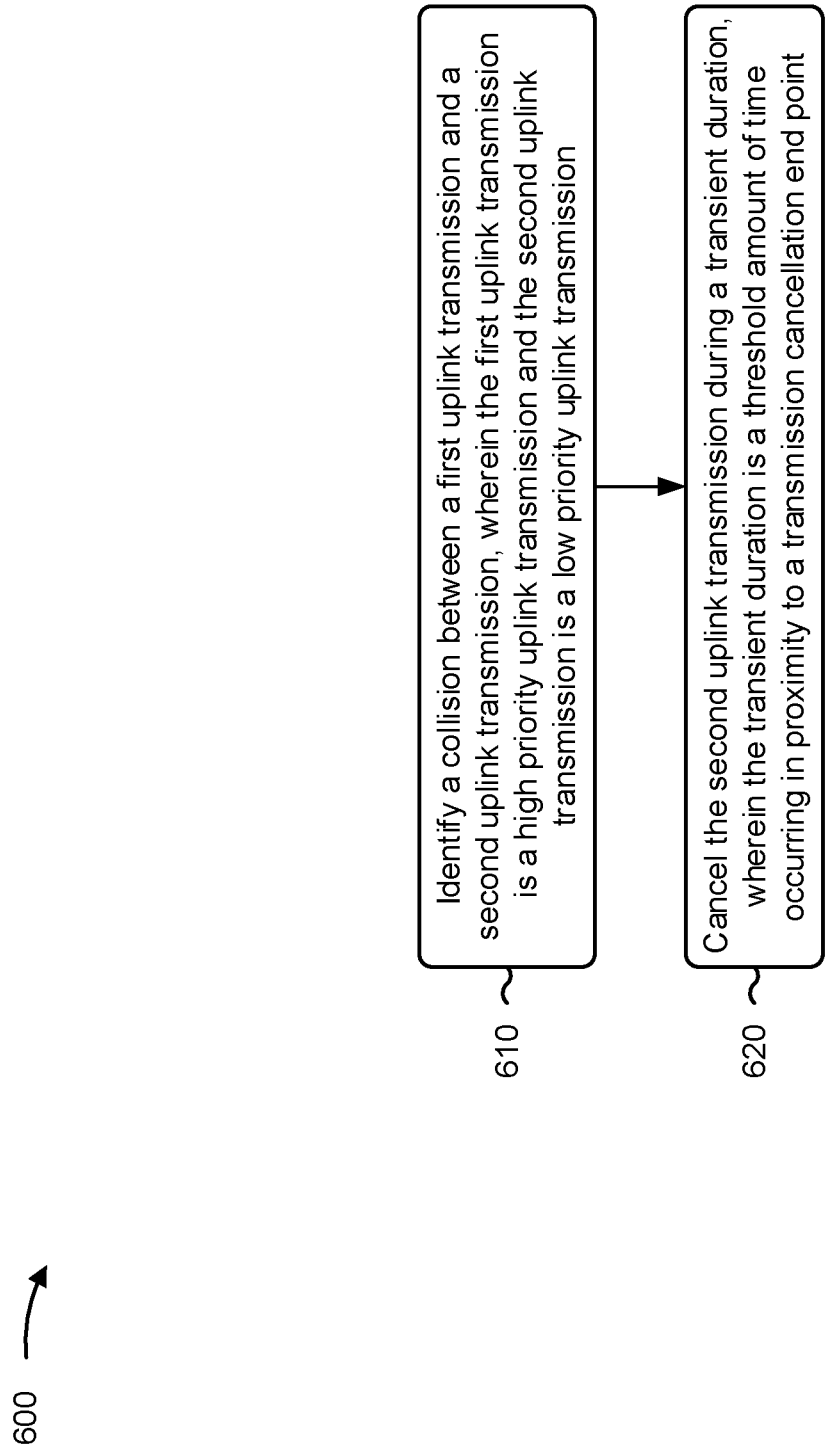

FIG. 6 is a diagram illustrating an example process 600 performed, for example, by a UE, in accordance with various aspects of the present disclosure. Example process 600 is an example where the UE (e.g., UE 120 and/or the like) performs operations associated with uplink transmission interruption.

As shown in FIG. 6, in some aspects, process 600 may include identifying a collision between a first uplink transmission and a second uplink transmission, wherein the first uplink transmission is a high priority uplink transmission and the second uplink transmission is a low priority uplink transmission (block 610). For example, the UE (e.g., using receive processor 258, transmit processor 264, controller/processor 280, memory 282, and/or the like) may identify a collision between a first uplink transmission and a second uplink transmission, as described above. In some aspects, the first uplink transmission is a high priority uplink transmission and the second uplink transmission is a low priority uplink transmission.

As further shown in FIG. 6, in some aspects, process 600 may include cancelling the second uplink transmission during a transient duration, wherein the transient duration is a threshold amount of time occurring in proximity to a transmission cancellation end point (block 620). For example, the UE (e.g., using receive processor 258, transmit processor 264, controller/processor 280, memory 282, and/or the like) may cancel the second uplink transmission during a transient duration, as described above. In some aspects, the transient duration is a threshold amount of time occurring in proximity to a transmission cancellation end point.

Process 600 may include additional aspects, such as any single aspect or any combination of aspects described below and/or in connection with one or more other processes described elsewhere herein.

In a first aspect, the transmission cancellation end point is defined based at least in part on a fixed value or a processing time.

In a second aspect, alone or in combination with the first aspect, the transient duration occurs immediately before the transmission cancellation end point.

In a third aspect, alone or in combination with one or more of the first and second aspects, the transient duration occurs immediately after the transmission cancellation end point.

In a fourth aspect, alone or in combination with one or more of the first through third aspects, the transient duration occurs at least partially before and at least partially after the transmission cancellation end point.

In a fifth aspect, alone or in combination with one or more of the first through fourth aspects, a time position of the transient duration relative to the transmission cancellation end point is based at least in part on a time position of the first uplink transmission relative to the transmission cancellation end point.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
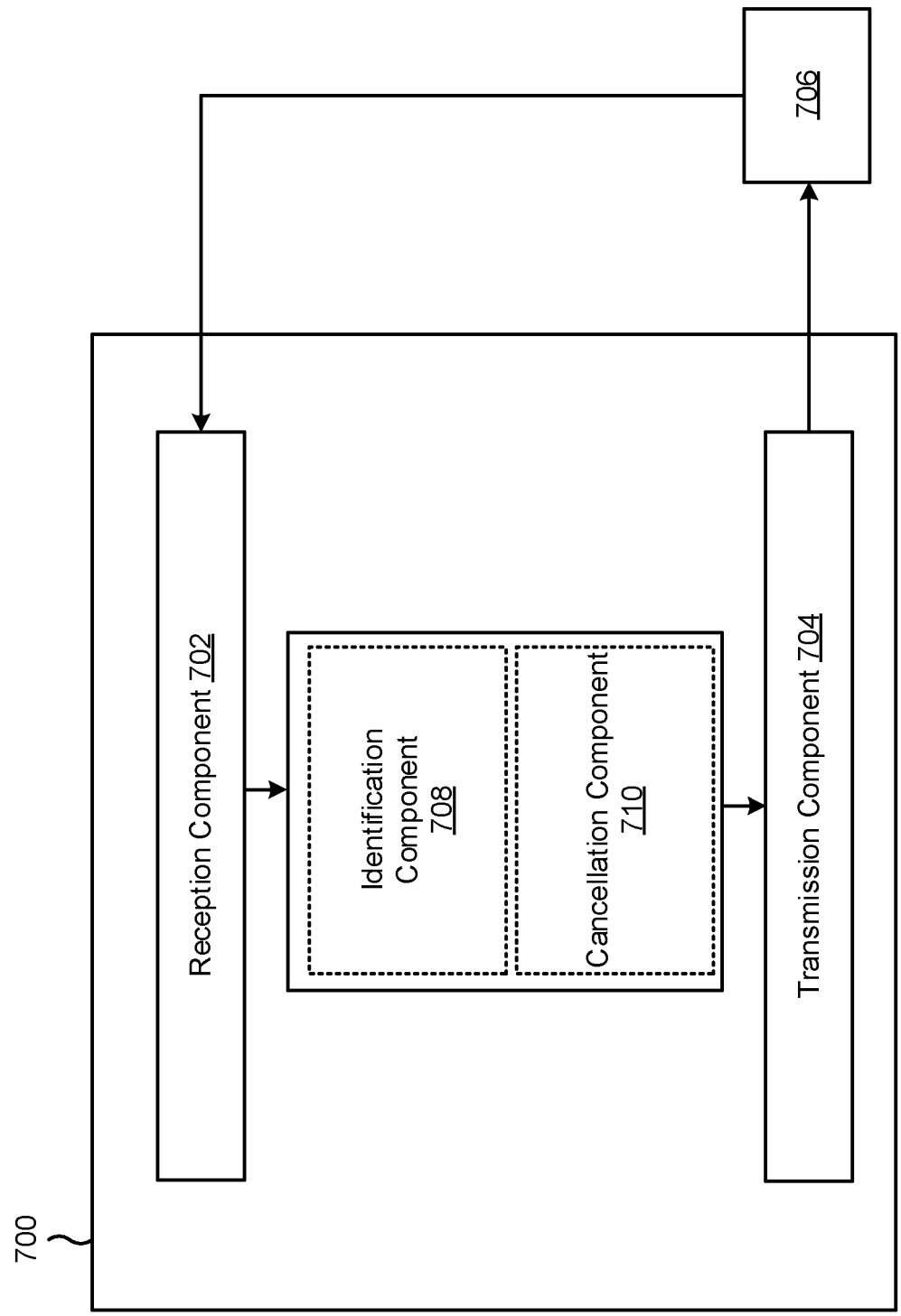
FIG. 7 is a block diagram of an example apparatus for wireless communication, in accordance with various aspects of the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of an identification component 708 or a cancellation component 710, among other examples.

In some aspects, the apparatus 700 may be configured to perform one or more operations described herein in connection with FIGS. 3-4. Additionally, or alternatively, the apparatus 700 may be configured to perform one or more processes described herein, such as process 500 of FIG. 5, process 600 of FIG. 6, or a combination thereof. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The identification component 708 may identify a collision between a first uplink transmission and a second uplink transmission, wherein the first uplink transmission is a high priority uplink transmission and the second uplink transmission is a low priority uplink transmission. The cancellation component 710 may cancel the second uplink transmission during a defined time period wherein the defined time period has an end point before a first overlapping symbol of the first uplink transmission and the second uplink transmission, wherein the first overlapping symbol is based at least in part on a processing time and an offset, and wherein the defined time period has a start point based at least in part on a triggering event for the first uplink transmission or a UE capability.

The identification component 708 may identify a collision between a first uplink transmission and a second uplink transmission, wherein the first uplink transmission is a high priority uplink transmission and the second uplink transmission is a low priority uplink transmission. The cancellation component 710 may cancel the second uplink transmission during a transient duration wherein the transient duration is a threshold amount of time occurring in proximity to a transmission cancellation end point.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some aspects of the present disclosure:

Aspect 1: A method of wireless communication performed by a user equipment (UE), comprising: identifying a collision between a first uplink transmission and a second uplink transmission, wherein the first uplink transmission is a high priority uplink transmission and the second uplink transmission is a low priority uplink transmission; and cancelling the second uplink transmission during a defined time period, wherein the defined time period has an end point before a first overlapping symbol of the first uplink transmission and the second uplink transmission, wherein the first overlapping symbol is based at least in part on a processing time and an offset, and wherein the defined time period has a start point based at least in part on a triggering event for the first uplink transmission or a UE capability.

Aspect 2: The method of aspect 1, wherein identifying the collision comprises: identifying the collision based at least in part on receipt of an uplink cancellation indicator.

Aspect 3: The method of any of aspects 1 to 2, wherein the defined time period is before a first overlapping symbol of the first uplink transmission and the second uplink transmission.

Aspect 4: The method of any of aspects 1 to 3, wherein the end point is a threshold amount of time after a triggering event for the first uplink transmission, wherein the threshold amount of time is based at least in part on the processing time and the offset.

Aspect 5: The method of aspect 4, wherein the triggering event is an end of a control resource set in which the UE receives a grant for the first uplink transmission, and wherein the start point is at or after the end of the control resource set.

Aspect 6: The method of any of aspects 1 to 5, wherein the start point is a threshold amount of time before the end point, wherein the threshold amount of time is a fixed value or based at least in part on the UE capability.

Aspect 7: The method of any of aspects 1 to 6, wherein at least one of the start point or the end point is determined based at least in part on a first overlapping symbol of the first uplink transmission and the second uplink transmission.

Aspect 8: The method of any of aspects 1 to 7, wherein a first quantity of symbols defining the defined time period based at least in part on the UE capability and a second quantity of symbols defining the defined time period based at least in part on the processing time have a common subcarrier spacing.

Aspect 9: The method of any of aspects 1 to 8, wherein a quantity of symbols defining the defined time period has a subcarrier spacing based at least in part on at least one of: a minimum subcarrier spacing of a set of downlink or uplink carriers configured for the UE, a minimum subcarrier spacing of a set of uplink carriers on which the second uplink transmission is to be carried and a set of downlink carriers on which a grant for the first uplink transmission is received, a subcarrier spacing of an uplink carrier on which the first uplink transmission is to be carried, or a subcarrier spacing of an uplink carrier on which the second uplink transmission is to be carried.

Aspect 10: A method of wireless communication performed by a user equipment (UE), comprising: identifying a collision between a first uplink transmission and a second uplink transmission, wherein the first uplink transmission is a high priority uplink transmission and the second uplink transmission is a low priority uplink transmission; and cancelling the second uplink transmission during a transient duration, wherein the transient duration is a threshold amount of time occurring in proximity to a transmission cancellation end point.

Aspect 11: The method of aspect 10, wherein the transmission cancellation end point is defined based at least in part on a fixed value or a processing time.

Aspect 12: The method of any of aspects 10 to 11, wherein the transient duration occurs immediately before the transmission cancellation end point.

Aspect 13: The method of any of aspects 10 to 12, wherein the transient duration occurs immediately after the transmission cancellation end point.

Aspect 14: The method of any of aspects 10 to 13, wherein the transient duration occurs at least partially before and at least partially after the transmission cancellation end point.

Aspect 15: The method of any of aspects 10 to 14, wherein a time position of the transient duration relative to the transmission cancellation end point is based at least in part on a time position of the first uplink transmission relative to the transmission cancellation end point.

Aspect 16: An apparatus for wireless communication at a device, comprising a processor; memory coupled with the processor; and instructions stored in the memory and executable by the processor to cause the apparatus to perform the method of one or more aspects of aspects 1-9.

Aspect 17: A device for wireless communication, comprising a memory and one or more processors coupled to the memory, the memory and the one or more processors configured to perform the method of one or more aspects of aspects 1-9.

Aspect 18: An apparatus for wireless communication, comprising at least one means for performing the method of one or more aspects of aspects 1-9.

Aspect 19: A non-transitory computer-readable medium storing code for wireless communication, the code comprising instructions executable by a processor to perform the method of one or more aspects of aspects 1-9.

Aspect 20: A non-transitory computer-readable medium storing a set of instructions for wireless communication, the set of instructions comprising one or more instructions that, when executed by one or more processors of a device, cause the device to perform the method of one or more aspects of aspects 1-9.

Aspect 21: An apparatus for wireless communication at a device, comprising a processor; memory coupled with the processor; and instructions stored in the memory and executable by the processor to cause the apparatus to perform the method of one or more aspects of aspects 10-15.

Aspect 22: A device for wireless communication, comprising a memory and one or more processors coupled to the memory, the memory and the one or more processors configured to perform the method of one or more aspects of aspects 10-15.

Aspect 23: An apparatus for wireless communication, comprising at least one means for performing the method of one or more aspects of aspects 10-15.

Aspect 24: A non-transitory computer-readable medium storing code for wireless communication, the code comprising instructions executable by a processor to perform the method of one or more aspects of aspects 10-15.

Aspect 25: A non-transitory computer-readable medium storing a set of instructions for wireless communication, the set of instructions comprising one or more instructions that, when executed by one or more processors of a device, cause the device to perform the method of one or more aspects of aspects 10-15.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   identifying a collision between a first uplink transmission and a second uplink transmission, wherein the first uplink transmission is a high priority uplink transmission and the second uplink transmission is a low priority uplink transmission; and
   cancelling the second uplink transmission during a defined time period,
      wherein the defined time period has an end point before a first overlapping symbol of the first uplink transmission and the second uplink transmission, wherein the first overlapping symbol is based at least in part on a processing time and an offset, and wherein the defined time period has a start point based at least in part on a UE capability, and
   wherein at least one of:
      a first quantity of symbols, defining the defined time period based at least in part on the UE capability, and a second quantity of symbols, defining the defined time period based at least in part on the processing time, have a common subcarrier spacing, or
      a third quantity of symbols defining the defined time period has a subcarrier spacing based at least in part on at least one of:
         a minimum subcarrier spacing of a first set of downlink carriers configured for the UE or a first set of uplink carriers configured for the UE,
         a minimum subcarrier spacing of a second set of uplink carriers on which the second uplink transmission is to be carried and a second set of downlink carriers on which a grant for the first uplink transmission is received, or
         a subcarrier spacing of the set of uplink carriers associated with carrying at least one of the first uplink transmission or the second uplink transmission.

2. The method of claim 1, wherein identifying the collision comprises:
   identifying the collision based at least in part on receipt of an uplink cancellation indicator.

3. The method of claim 1, wherein the defined time period is before a first overlapping symbol of the first uplink transmission and the second uplink transmission.

4. The method of claim 1, wherein the end point is a threshold amount of time after a triggering event for the first uplink transmission, wherein the threshold amount of time is based at least in part on the processing time and the offset.

5. The method of claim 4, wherein the triggering event is an end of a control resource set in which the UE receives a grant for the first uplink transmission, and wherein the start point is at or after the end of the control resource set.

6. The method of claim 1, wherein the start point is a threshold amount of time before the end point, wherein the threshold amount of time is a fixed value or based at least in part on the UE capability.

7. The method of claim 1, wherein at least one of the start point or the end point is determined based at least in part on a first overlapping symbol of the first uplink transmission and the second uplink transmission.

8. The method of claim 1, wherein the high priority uplink transmission is associated with a physical uplink control channel (PUCCH) and the low priority uplink transmission is associated with a low priority physical uplink shared channel (PUSCH).

9. The method of claim 1, further comprising:
   receiving a grant for the first uplink transmission,
      wherein identifying the collision is based at least in part on receiving the grant.

10. A method of wireless communication performed by a user equipment (UE), comprising:
    identifying a collision between a first uplink transmission and a second uplink transmission, wherein the first uplink transmission is a high priority uplink transmission and the second uplink transmission is a low priority uplink transmission; and
    cancelling the second uplink transmission during a transient duration associated with a power transition period associated with canceling the second uplink transmission,
       wherein the transient duration is a threshold amount of time occurring in proximity to a transmission cancellation end point.

11. The method of claim 10, wherein the transmission cancellation end point is defined based at least in part on a fixed value or a processing time.

12. The method of claim 10, wherein the transient duration occurs immediately before the transmission cancellation end point.

13. The method of claim 10, wherein the transient duration occurs at least partially before and at least partially after the transmission cancellation end point.

14. The method of claim 10, wherein a time position of the transient duration relative to the transmission cancellation end point is based at least in part on a time position of the first uplink transmission relative to the transmission cancellation end point.

15. The method of claim 10, further comprising:
    receiving a grant for the first uplink transmission,
       wherein identifying the collision is based at least in part on receiving the grant.

16. A user equipment (UE) for wireless communication, comprising:
    a memory; and
    one or more processors coupled to the memory, the one or more processors configured to:

identify a collision between a first uplink transmission and a second uplink transmission, wherein the first uplink transmission is a high priority uplink transmission and the second uplink transmission is a low priority uplink transmission; and cancel the second uplink transmission during a defined time period, wherein the defined time period has an end point before a first overlapping symbol of the first uplink transmission and the second uplink transmission, wherein the first overlapping symbol is based at least in part on a processing time and an offset, and wherein the defined time period has a start point based at least in part on a UE capability, and wherein at least one of:

a first quantity of symbols, defining the defined time period based at least in part on the UE capability, and a second quantity of symbols, defining the defined time period based at least in part on the processing time, have a common subcarrier spacing, or a third quantity of symbols defining the defined time period has a subcarrier spacing based at least in part on at least one of:

a minimum subcarrier spacing of a first set of downlink carriers configured for the UE or a first set of uplink carriers configured for the UE, a minimum subcarrier spacing of a second set of uplink carriers on which the second uplink transmission is to be carried and a second set of downlink carriers on which a grant for the first uplink transmission is received, or a subcarrier spacing of the set of uplink carriers associated with carrying at least one of the first uplink transmission or the second uplink transmission.

17. The UE of claim 16, wherein the one or more processors, when identifying the collision, are configured to:
identify the collision based at least in part on receipt of an uplink cancellation indicator.

18. The UE of claim 16, wherein the defined time period is before a first overlapping symbol of the first uplink transmission and the second uplink transmission.

19. The UE of claim 16, wherein the end point is a threshold amount of time after a triggering event for the first uplink transmission, wherein the threshold amount of time is based at least in part on the processing time and the offset.

20. The UE of claim 19, wherein the triggering event is an end of a control resource set in which the UE receives a grant for the first uplink transmission, and wherein the start point is at or after the end of the control resource set.

21. The UE of claim 16, wherein the start point is a threshold amount of time before the end point, wherein the threshold amount of time is a fixed value or based at least in part on the UE capability.

22. The UE of claim 16, wherein at least one of the start point or the end point is determined based at least in part on a first overlapping symbol of the first uplink transmission and the second uplink transmission.

23. The UE of claim 16, wherein the high priority uplink transmission is associated with a physical uplink control channel (PUCCH) and the low priority uplink transmission is associated with a low priority physical uplink shared channel (PUSCH).

24. The UE of claim 16, wherein the one or more processors are further configured to:
receive a grant for the first uplink transmission,
wherein the collision is identified based at least in part on receiving the grant.

25. A user equipment (UE) for wireless communication, comprising:

a memory; and one or more processors coupled to the memory, the one or more processors configured to:

identify a collision between a first uplink transmission and a second uplink transmission, wherein the first uplink transmission is a high priority uplink transmission and the second uplink transmission is a low priority uplink transmission; and cancel the second uplink transmission during a transient duration associated with a power transition period associated with canceling the second uplink transmission, wherein the transient duration is a threshold amount of time occurring in proximity to a transmission cancellation end point.

26. The UE of claim 25, wherein the transmission cancellation end point is defined based at least in part on a fixed value or a processing time.

27. The UE of claim 25, wherein the transient duration occurs immediately before the transmission cancellation end point.

28. The UE of claim 25, wherein the transient duration occurs at least partially before and at least partially after the transmission cancellation end point.

29. The UE of claim 25, wherein a time position of the transient duration relative to the transmission cancellation end point is based at least in part on a time position of the first uplink transmission relative to the transmission cancellation end point.

30. The UE of claim 25, wherein the one or more processors are further configured to:
receive a grant for the first uplink transmission,
wherein the collision is identified based at least in part on receiving the grant.

* * * * *